(No Model.) 2 Sheets—Sheet 1.

A. T. BROWN.
VEHICLE TIRE.

No. 542,752. Patented July 16, 1895.

WITNESSES:
C. E. Tomlinson.
E. S. Borst.

INVENTOR
Alexander T. Brown
By Smith & Denison
his ATTORNEYS.

(No Model.) 2 Sheets—Sheet 2.
A. T. BROWN.
VEHICLE TIRE.
No. 542,752. Patented July 16, 1895.
Fig-4-
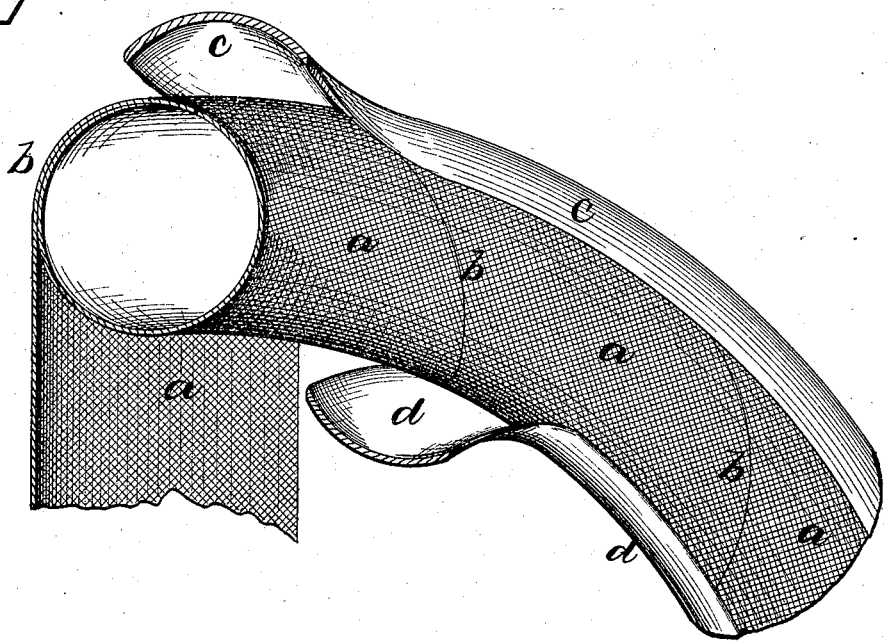
Fig-5.
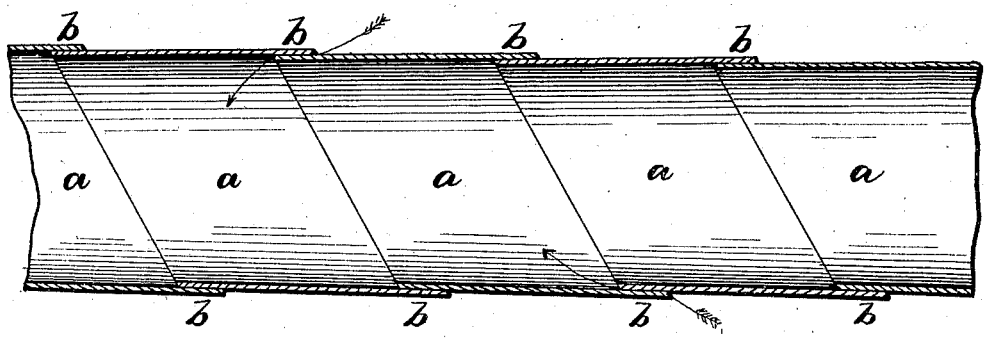
WITNESSES: INVENTOR
Alexander T Brown
By Smith & Denison
his ATTORNEYS.

UNITED STATES PATENT OFFICE.

ALEXANDER T. BROWN, OF SYRACUSE, NEW YORK.

VEHICLE-TIRE.

SPECIFICATION forming part of Letters Patent No. 542,752, dated July 16, 1895.

Application filed October 11, 1894. Serial No. 525,564. (No model.)

*To all whom it may concern:*

Be it known that I, ALEXANDER T. BROWN, of Syracuse, in the county of Onondaga, in the State of New York, have invented new and useful Improvements in Vehicle-Tires, of which the following, taken in connection with the accompanying drawings, is a full, clear, and exact description.

The invention relates to improvements in vehicle-tires of the class generally designated as "pneumatic;" and it consists, essentially, in constructing the tubular body of the tire of a single strip of suitable material spirally wound to form inclined or oblique side pockets or openings, as will be hereinafter more fully explained, and specifically set forth in the claims.

The principal object of the invention is to produce a tire of the above-mentioned class the body of which shall be provided with a series of inclined or oblique pockets or openings, whereby any portion of the air-tube contained within said body which may have become punctured or in any way injured may be readily and quickly removed and repaired without necessitating the removal of the entire tube or the removal of the tire from the wheel-rim.

Another object of the invention is to so construct the inclined or oblique pockets or openings that they will be kept tightly closed by the inflation of the air-tube.

These objects are attained by the means illustrated in the accompanying drawings, in which—

Figure 1:
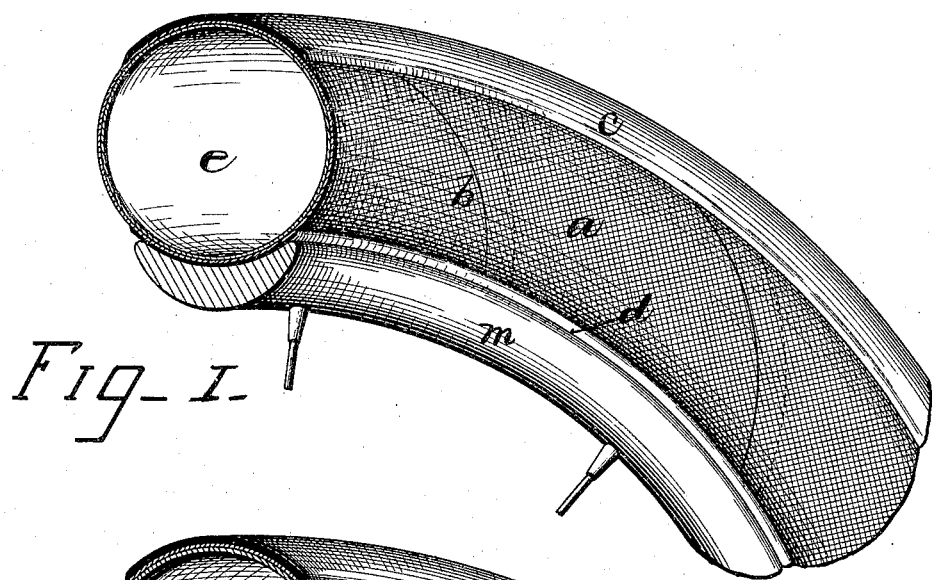
Figure 2:
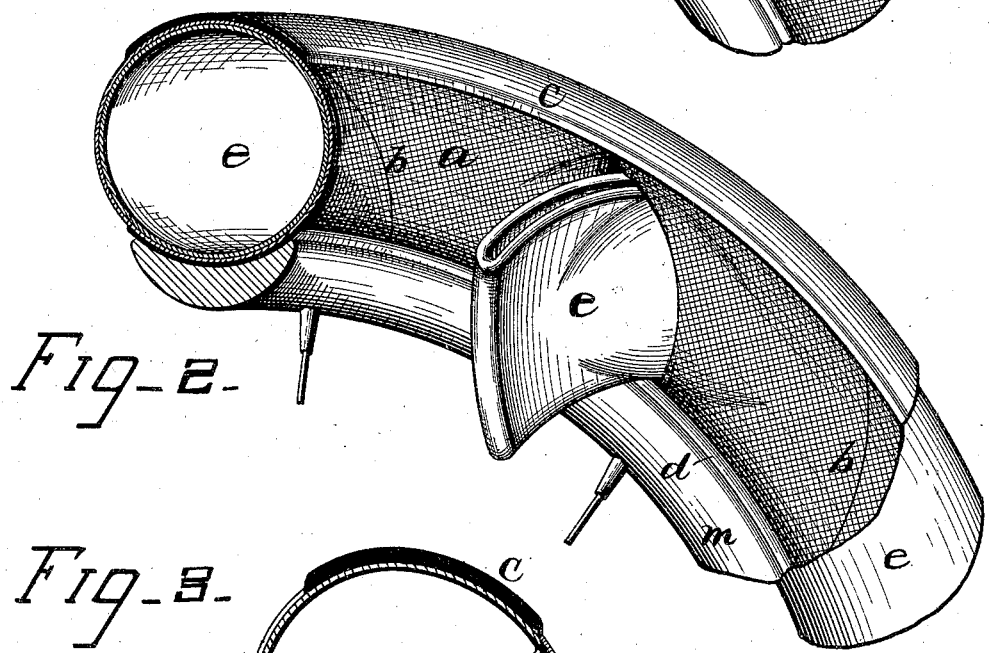
Figure 3:
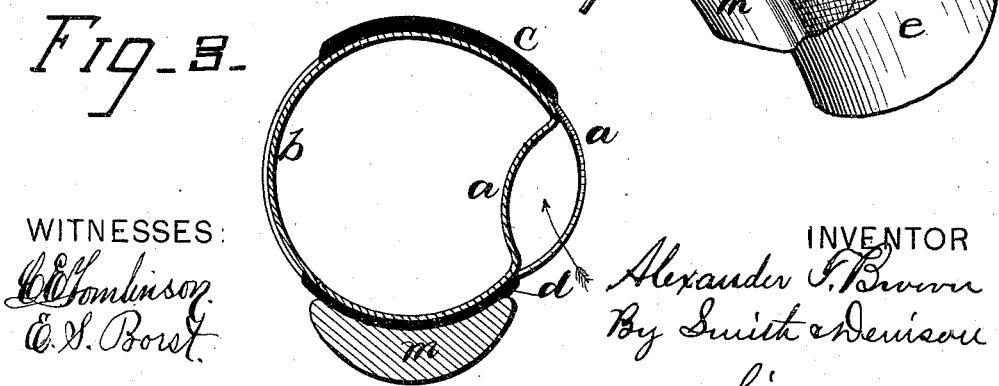

Figure 1 represents a sectional elevation of a portion of my improved tire; Fig. 2, a similar view showing a portion of the air-tube partly drawn out through one of the side pockets or openings; Fig. 3, a transverse sectional view of the tire-body and wheel-rim, showing one of the side pockets or openings in extended position; Fig. 4, a detail view showing the method of winding the body and applying the inner and outer protecting strips; and Fig. 5, a longitudinal sectional view of a portion of the tire-body wound, showing the overlapping edges which form the pockets or openings.

In constructing my improved tire-body, as illustrated in the accompanying drawings, I take a strip or band of suitable material and proper length and wind the same spirally around a suitable mandrel, lapping the rear edge onto the front edge of the preceding wind, and then securing together, by cement or otherwise, that portion of each lap which constitutes the tread of the tire and, in some instances, that portion which is to be seated in the wheel-rim, leaving the portion between the tread and the rim on each side thereof unsecured to form pockets or openings for the insertion and removal, or partial removal, of the air-tube when deflated; but said pockets or openings will be tightly closed when said air-tube is inserted and inflated.

Referring to the drawings, the letter *a* indicates the body of the tire, which consists of a band or strip of proper width and length and of suitable material, preferably a fabric made waterproof by rubber or in any other manner, and which is wound, as heretofore described, around a mandrel or core in such manner that the edge of each wind overlaps the edge of the preceding wind, forming pockets or openings *b*, which may be made of any desired width by cementing together the laps at the inner and outer peripheral portions of the tire-body. The ends of the body are secured together in any well-known manner. Upon the outer peripheral portion of said tire-body is secured a strip of suitable material to form a suitable tread *c*, and upon the inner peripheral portion is secured a similar strip to form a proper bearing *d* for the body in its seat upon the wheel-rim. These strips are preferably vulcanized onto the tire-body, or they may be secured in any other well-known way; but in any event the overlapping edges under each strip are likewise secured together; but those portions of said overlapping edges between the strips on each side or lateral face of the body are not secured together, care being taken to specifically avoid the adhesion of these particular portions.

The body is secured onto the rim *m* of the wheel by means of cement, as is usual with this kind of tire, and need never be removed except to be replaced by a new tire. If it is desired, the bearing-strip may be dispensed with and the tire-body seated directly onto the wheel-rim, in which case the laps of the inner peripheral portion are preferably secured together by cement the width of the rim, and the tire-body made substantially, if not absolutely, non-elastic.

The air-tube $e$ is inserted by extending one of the pockets as shown in Fig. 3, and when inflated all of the pockets are tightly closed against the entrance of dirt and water. If desired, any number of the pockets or openings may be cemented together, as it is only necessary to have as many pockets as will be sufficient to readily permit the inspection and removal of any portion of the tube.

I am aware that hose has been made by winding a strip of material spirally with overlapping edges and securing the laps tightly together their entire length; but I am not aware of any construction wherein the laps are partially secured together, leaving portions unsecured to form or create pockets or openings through which access may be had to the interior of said hose or tube, nor am I aware that any tire has ever been provided with pockets or openings extending in an inclined or oblique direction from the wheel-rim to the tread of the tire.

Having thus fully described my invention, what I claim as new, and desire to secure by Letters Patent, is—

1. A body for a vehicle tire, consisting of a band or strip wound spirally with overlapping edges, and having the outer peripheral portion of said overlapping edges secured together, whereby inclined or oblique side pockets or openings are formed, substantially as and for the purpose specified.

2. A vehicle tire, consisting of an air-tube and a covering for the same having a series of inclined or oblique side pockets, whereby access may be had to any portion of said air-tube without entirely removing the same.

3. A vehicle tire, consisting of an air-tube and a covering for the same having a series of inclined or oblique side pockets formed by the overlapping edges in spirally winding said covering, as and for the purpose specified.

4. In a pneumatic tire, a covering for the air-tube, consisting of a band or strip spirally wound with overlapping edges, the outer and inner peripheral portions of said overlapping edges secured together, leaving inclined or oblique side openings, as and for the purpose specified.

5. A vehicle tire, consisting of an air-tube, a covering for the same having a series of inclined or oblique side pockets formed by spirally winding said covering, and a tread secured onto the covering.

6. A vehicle tire, consisting of an air-tube, a covering for the same having a series of inclined or oblique side pockets formed by spirally winding said covering, a tread formed on the outer periphery of the covering and a bearing on the inner periphery thereof, substantially as specified.

7. A vehicle tire, consisting of an air-tube and a covering for the same provided with a suitable tread and a bearing strip, and with a series of pockets extending in an inclined or oblique direction from said tread to said bearing-strip, as and for the purpose specified.

In witness whereof I have hereunto set my hand on this 8th day of October, 1894.

ALEXANDER T. BROWN.

In presence of—
C. W. SMITH,
HOWARD P. DENISON.